(No Model.)
G. H. YORAN.
TRACE FASTENER.
No. 582,409. Patented May 11, 1897.
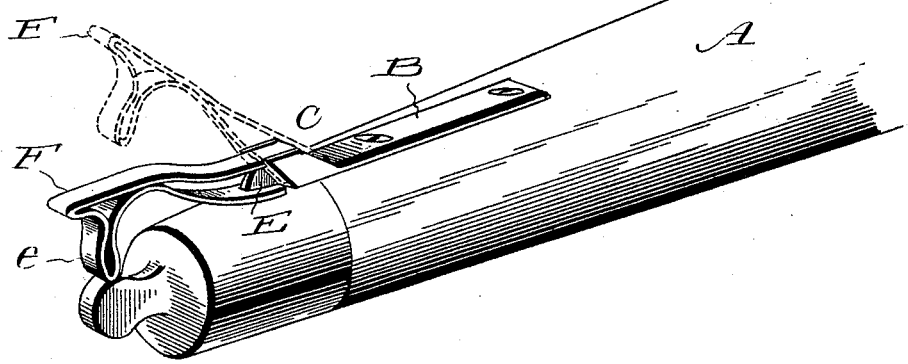
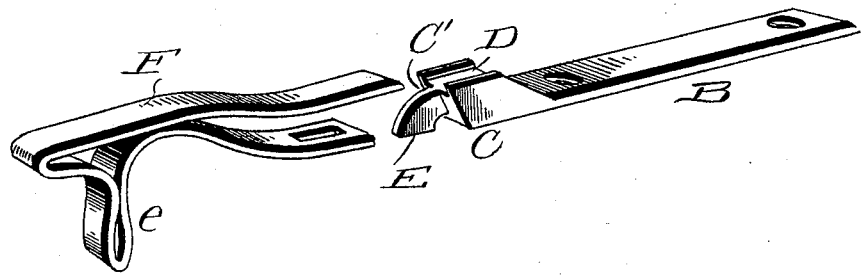
Witnesses:
L. C. Hills
A. L. Hough
Inventor:
George H. Yoran,
by Franklin H. Hough
Atty.

UNITED STATES PATENT OFFICE.

GEORGE H. YORAN, OF DOLGEVILLE, NEW YORK.

TRACE-FASTENER.

SPECIFICATION forming part of Letters Patent No. 582,409, dated May 11, 1897.

Application filed March 11, 1897. Serial No. 627,007. (No model.)

*To all whom it may concern:*

Be it known that I, GEORGE H. YORAN, a citizen of the United States, residing at Dolgeville in the county of Herkimer and State of New York, have invented certain new and useful Improvements in Trace-Retainers; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to certain new and useful improvements in trace-holders which are adapted to be secured to a whiffletree of a vehicle to hold the trace to the end thereof; and the invention consists, specifically, of the provision of a one-piece spring-hook which is detachably held to a member which is carried on the whiffletree and secured to the said member without any pivots or screws, the said hook being constructed so that its free end will be normally held in contact with the whiffletree under tension of the spring-bar, which forms part of the hook, bearing against the shoulder on the member to which the hook is connected in the manner which will hereinafter be set forth.

To these ends and to such others as the invention may pertain the same consists, further, in the novel construction, combination, and adaptation of parts, as will be hereinafter more clearly described, and then specifically defined in the appended claim.

I clearly illustrate my invention in the accompanying drawings, in which—

Figure 1 is a perspective of my invention as applied to the whiffletree. Fig. 2 is a detailed view of the spring-actuated hook as detached from the member adapted to carry the same, the two parts being shown in their relative positions preparatory to their being connected together.

Reference being had to the details of the drawings by letter, A designates a whiffletree in the end of which is secured, preferably by screws, the member B, which has a shoulder C at its outer end, the ends of which shoulder are inclined at an angle, as seen at C'. The upper surface of the said shouldered end is recessed out, as seen at D, and forwardly projecting and downwardly curved from the outer end of the said member is the hook E, the free end of which is in a plane coincident with the lower surface of the said member.

The one-piece spring-hook F is made of metal, preferably of steel, one portion of which is downwardly bent, as seen at e, forming the hook, and at one end of the bar forming the hook is an elongated aperture of such a size as to receive the hooked end on the said member B, as seen clearly in the drawings. The opposite end of the said one-piece spring-hook is backwardly projected and is adapted to rest within the recess D on the top of the shoulder and be guided therein as the hook is raised and lowered for the purpose of allowing the trace to be looped onto the whiffletree. As the hook is raised the upper portion of the hook, which serves the purpose of a spring-bar, contacts with the edge of the shoulder and throws the spring slightly backward, causing a tension of the same, which readily returns the hook to its lowest throw when the spring is released.

Having thus described my invention, what I claim to be new, and desire to secure by Letters Patent, is—

In a trace-hook retainer, consisting of the member B secured to a whiffletree, a shouldered end of the said member being provided with a forwardly and downwardly curved hook, the upper face of the shoulder being recessed, combined with the one-piece spring-hook, which is apertured near one end to engage with the said forwardly and downwardly curved hook of the member B, the other end of the said hook resting in the recessed face of the shoulder and adapted to bear against the shoulder, serving as a spring to hold the hook normally closed, substantially as shown and described.

In testimony whereof I affix my signature in presence of two witnesses.

GEORGE H. YORAN.

Witnesses:
LUDWIG GERHART,
ELI F. FENNER.